(12) United States Patent
Beutler

(10) Patent No.: US 10,709,209 B2
(45) Date of Patent: Jul. 14, 2020

(54) CLOSURE DEVICE

(71) Applicant: Joerg Beutler, Holzkirchen (DE)

(72) Inventor: Joerg Beutler, Holzkirchen (DE)

( * ) Notice: Subject to any disclaimer, the term of this patent is extended or adjusted under 35 U.S.C. 154(b) by 24 days.

(21) Appl. No.: 15/946,659

(22) Filed: Apr. 5, 2018

(65) Prior Publication Data

US 2018/0289112 A1    Oct. 11, 2018

(30) Foreign Application Priority Data

Apr. 5, 2017    (EP) .................................... 17164916

(51) Int. Cl.
*A44B 11/25*    (2006.01)
*B60R 22/00*    (2006.01)
*B60R 22/48*    (2006.01)

(52) U.S. Cl.
CPC ...... *A44B 11/2573* (2013.01); *A44B 11/2592* (2013.01); *B60R 22/00* (2013.01); *A44B 11/2557* (2013.01); *B60R 22/48* (2013.01); *B60R 2022/4816* (2013.01)

(58) Field of Classification Search
CPC ............ A44B 11/2557; A44B 11/2573; A44B 11/2592; B60R 2022/4816; B60R 22/00; B60R 22/48
See application file for complete search history.

(56) References Cited

U.S. PATENT DOCUMENTS

| | | |
|---|---|---|
| 2,153,077 A | 4/1939 | Clarke |
| 2,902,737 A | 9/1959 | Moran |
| 4,587,695 A * | 5/1986 | Jensen ................. A44B 11/253 24/615 |
| 4,616,861 A * | 10/1986 | Kurosaki .............. E05C 19/022 292/129 |
| 7,146,692 B2 * | 12/2006 | Benedict ............ A44B 11/2519 24/635 |
| 7,225,511 B2 * | 6/2007 | Benedict ............ A44B 11/2523 24/635 |

(Continued)

FOREIGN PATENT DOCUMENTS

| | | |
|---|---|---|
| DE | 2065866 | 6/1977 |
| EP | 3042807 A1 | 7/2016 |

OTHER PUBLICATIONS

European Search Report from the European Patent Office for Application No. 17164916.3-1503, dated Jul. 11, 2017.

*Primary Examiner* — Robert Sandy
*Assistant Examiner* — David M Upchurch
(74) *Attorney, Agent, or Firm* — Kolitch Romano LLP

(57) ABSTRACT

A closure device for closing and locking a restraint system, such as a restraint system for an amusement vehicle, includes a blocking device, and a locking device having a first connecting member and a second connecting member. The locking device and the blocking device interact in such a way that, in at least a first position of the locking device relative to the blocking device, the first connecting member is releasable coupled to the second connecting member. Furthermore, in at least a second position of the locking device relative to the blocking device, the blocking device prevents release of the first connecting member from the second connecting member. In some examples, the second position includes the locking device being inserted at least partially into the blocking device.

16 Claims, 4 Drawing Sheets

(56) References Cited

U.S. PATENT DOCUMENTS

| | | | | |
|---|---|---|---|---|
| 7,263,749 B2* | 9/2007 | Benedict | ............ | A44B 11/2519 |
| | | | | 24/635 |
| 7,350,277 B1* | 4/2008 | Canfield | .............. | A44B 11/253 |
| | | | | 24/634 |
| 8,245,370 B2* | 8/2012 | Ritter | ..................... | B64G 1/646 |
| | | | | 24/595.1 |
| 2002/0149243 A1 | 10/2002 | Galbreath | | |

* cited by examiner

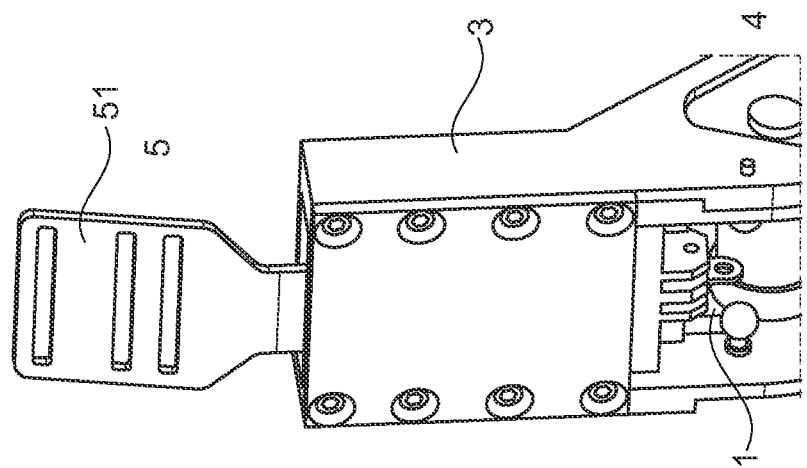
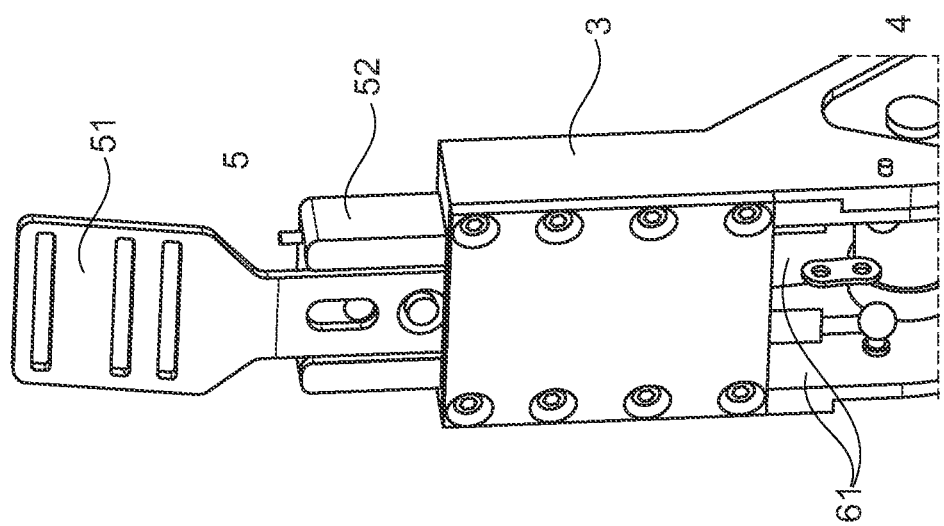
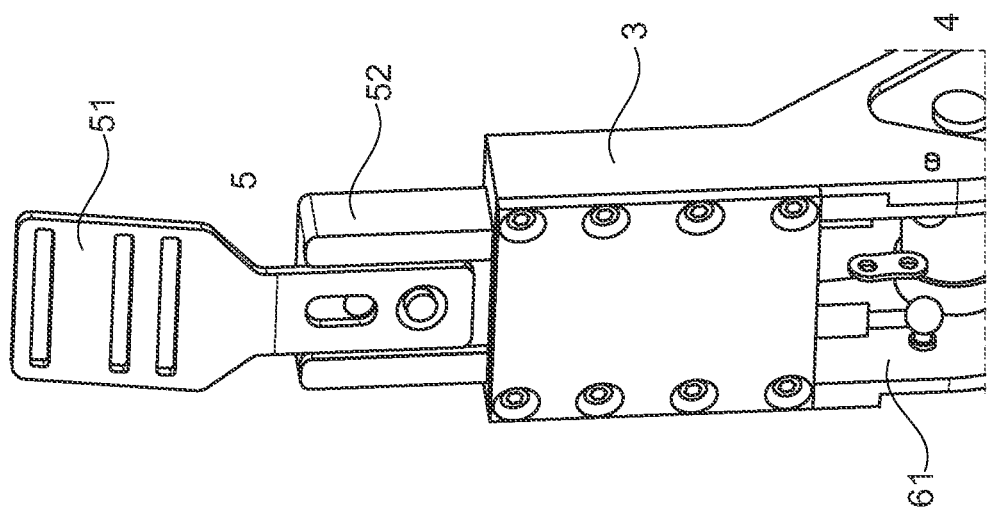

CLOSURE DEVICE

CROSS-REFERENCE TO RELATED APPLICATION

This application claims priority to European Patent Application No. 17164916.3, filed Apr. 5, 2017, which is hereby incorporated by reference.

BACKGROUND

A plurality of closure devices for restraint systems for vehicles, e.g. in the form of belt systems, are known. For this purpose belt buckles are used, in which belt hooks are inserted and locked in a corresponding receptacle. Unlocking traditionally proceeds via a button for the purpose of opening and releasing the belt buckle and then the belt hook is pulled out of the belt buckle.

SUMMARY

It is an object of the present invention to provide a closure device which allows adjusting a restraint system to a respective user of a vehicle and facilitates secure closing of a restraint member, combined with simplified operation, free from external constraints.

In one or more embodiments of the present invention, the closure apparatus comprises a locking device having a first connecting member and a second connecting member, and a blocking device, characterised by the fact that the locking device and the blocking device interact in such a way that, in at least a first position relative to the blocking device and/or depending on the state of the blocking device, the locking device provides a releasable coupling between the first connecting member and the second connecting member against a predetermined minimum counterforce and/or by a movement of the first connecting member relative to the second connecting member, wherein in at least a second position relative to the blocking device and/or depending on the state of the blocking device, the locking device provides a non-releasable coupling between the first connecting member and the second connecting member.

In one or more embodiments of the present invention, the first and the second connecting members can have different shapes which may be adapted to the respective purpose, such as hooks, handles, indentations, notches, grooves, etc., and are configured to complement each other, such that when the first connecting member is connected to the second connecting member (or vice versa) in the first position a releasable, form-fit coupling is created. This coupling can be released in the first position by applying a certain (tensile) force and/or by a relative movement of the connecting members.

In one or more embodiments of the present invention, in order to prevent release of the coupling and in order to prevent an unintentional, or otherwise, uncoupling of the connecting members during a ride, the locking device and/or the coupling of the first connecting member and of the second connecting member is locked and/or blocked by the blocking member.

In one or more embodiments of the present invention, the non-releasable coupling in the second position is created by a movement of the blocking device relative to the locking device. Consequently, either the locking device is actively moved towards the unmoved blocking device or the blocking device is actively moved towards the fixed locking device. A movement of both members towards each other is also conceivable.

For example, in one or more embodiments of the present invention, there is a releasable coupling of the first connecting member and the second connecting member in the first position of the locking device. By pushing the locking device into the blocking device an unreleasable coupling of the connecting elements is provided. In this state release of the coupling between the first connecting member and the second connecting member is prevented and blocked by the blocking device.

Alternatively, in one or more embodiments of the present invention, the non-releasable coupling in the second position of the locking device and the blocking device can be provided by electrical and/or magnetic and/or mechanical transfer of the blocking device from the first to the second position.

Thus, in one or more embodiments of the present invention, one or both connecting members of the locking device can, after the coupling has been provided in the first position, be blocked by a part of the blocking device which may be provided e.g. in the form of a bolt and thus the second position/state can be provided. The blocking device remains stationary in this regard and only the bolt, as part of the blocking device, is moved.

In one or more embodiments of the present invention, the second position can also be induced by way of an electromagnetic closure, whereby one or both connecting members are electromagnetically blocked.

In one or more embodiments of the present invention, other variants of the locking of the first connecting member and/or of the second connecting member in an electrical, magnetic or mechanical manner, whether alone or in combination, are possible.

In one or more embodiments of the present invention, the counter-force for releasing the first connecting member from the second connecting member in the first position/state may be adjustable.

In one or more embodiments of the present invention, by designing the geometry of the coupling areas of the two connecting members so as to complement each other, it is possible to determine the minimum force required to create a coupling and afterwards release the coupling in the first position/state by applying at least a predetermined force.

In one or more embodiments of the present invention, the device comprises a positioning member, which is disposed at the second connecting member and is capable of holding the second connecting member in a predetermined position.

In this regard, in one or more embodiments of the present invention, the second connecting member can be held in a position so as to apply a force to the first connecting member. This force supports the coupling of the two connecting members to each other in the first position/state and prevents accidental and unintentional release of the coupling.

In one or more embodiments of the present invention, the positioning member may be an elastic member, such as a spring, and/or include an elastic material and/or the locating of the second connecting member may be effected electrically and/or magnetically and/or mechanically.

In one or more embodiments of the present invention, the force for releasing the first connecting member from the second connecting member in the first position/state is applied or determined by the positioning member.

In one or more embodiments of the present invention, the force required to create contact between the coupling areas of the two connecting members can be applied by the positioning member alone. In case the positioning member is provided in the form of a spring, the spring force, either alone or to a great extent, determines the force applied to the coupling between first and second connecting member and thus the (counter-)force required to release this coupling. On the one hand the spring force at the second connecting member is rated to be strong enough to allow the first connecting member to be pulled out of the second connecting member as easily as possible. On the other hand, the coupling of the first connecting member and the second connecting member is prevented from being released by an unintentional force, e.g. applied to the first connecting member (e.g. via a connected belt) while the locking device is being inserted into the locking device.

In one or more embodiments of the present invention, the blocking device may have a sleeve shape, especially a housing shape, which at least partially encloses the locking device.

In one or more embodiments of the present invention, a plurality of housing shapes is conceivable in this regard. The blocking device can have a receptacle for introduction of the locking device. The critical factor is that, by virtue of the movement of the locking device relative to the blocking device, release of the coupling between first and second connecting member is prevented and/or blocked as a result of the shape of the housing, even if the predetermined minimum force necessary for releasing the first connecting element from the second connecting element in the first position/state is exceeded.

In one or more embodiments of the present invention, the locking device of the closure device may have a sensor which is suitable for monitoring the state of the locking device.

In one or more embodiments of the present invention, the integrated sensor registers, for example, whether the first connecting member, e.g. in the form of a belt hook, is coupled to the second connecting member and/or is inserted into the buckle, thereby ensuring that the coupling between the two connecting members and thus buckling-up can be reliably monitored.

In addition, the present invention refers to one or more embodiments of a method for closing a restraint system for persons, particularly in connection with the closure device described above, the method comprising the following steps:
1. Coupling of a first connecting member to a second connecting member;
2. Locking and securing of the second receiving member by a blocking device, wherein the time when step 1 is executed is offset from the time when step 2 is executed.

In one or more embodiments of the present invention, particularly steps 1 and 2 are carried out one after the other, particularly without time overlap.

In one or more embodiments of the present invention, in the first step, a releasable coupling between the connecting members is created. In this first position/state the two connecting members are in a first position relative to the blocking device and/or the blocking device is in a first state. If necessary, corrections can still be made and the coupling can be released, e.g. for a necessary change of seating position, by applying at least a predetermined (tensile) minimum force to release the coupling. In the second step, fixing/locking of the second connecting member at the first connecting member is provided, especially by inserting the connecting members that are already coupled into the blocking device, i.e. by moving the coupled connecting members into a second position relative to the blocking device. However, the present invention includes other possibilities of fixing/locking, especially possibilities of fixing/locking which do without moving the connecting members relative to the blocking member and/or which provide fixing/blocking by changing the state of the blocking member. Thus, any kind of locking the coupling between the two connecting members is conceivable.

In one or more embodiments of the present invention, the second method step which comprises locking of the coupling between the two connecting members is carried out at a separate time from the first method step which comprises providing a coupling between the first connecting member and the second connecting member. The second step is carried out later than the first step.

In one or more embodiments of the present invention, the coupling in method step 1 is effected by form-fitting, hooking, catching, latching and/or engaging.

As already described above, in one or more embodiments of the present invention any kind of releasable coupling and engagement between the first connecting member and the second connecting member is conceivable as a way of creating the coupling in the first position/state of the blocking device.

In one or more embodiments of the present invention, the coupling between the first connecting member and the second connecting member provided in the first method step can be released by applying a predetermined minimum force, e.g. by exerting a tensile minimum force on one of the connecting elements away from the other connecting element.

In order that in the first position the connecting members may be released from each other, e.g. to be able to change the seating position or the belt position, in one or more embodiments of the present invention a defined force must be applied and exceeded, respectively. This ensures that accidental release of the coupling is suppressed wherever the forces are less than the defined force.

In one or more embodiments of the present invention, in the second method step the coupling between the first connecting member and the second connecting member is fixed/blocked in order that the connecting elements are fixed to each other unreleasably, even when applying or exceeding the defined force between the connecting elements.

In one or more embodiments of the present invention, by virtue of the unreleasable fixing or locking, it is impossible for the passenger to open the restraint system intentionally or unintentionally, a fact which is essential for vehicles undergoing extreme movements, such as vehicles of amusement devices, e.g. roller coasters.

In addition, one or more embodiments of the present invention also refers to a method of opening/releasing a closed restraint system for persons, particularly in connection with the closure device described above, the method comprising the following steps:
1. Removing a second connecting member from a blocking device,
2. Releasing a coupling between a first connecting member and the second connecting member by application of at least a predetermined minimum force and/or by movement of the first connecting member and/or the second connecting member and/or by movement of the two connecting members relative to each other, wherein the time when step 1 is executed is offset from the time when step 2 is executed.

In one or more embodiments of the present invention, particularly steps 1 and 2 are carried out one after the other, particularly without time overlap.

In one or more embodiments of the present invention, releasing the restraint system is effected in the reverse order of the method steps for closing the restraint system as described above. First, unlocking of the locking device occurs. Then, the first connecting member is released from the second connecting member as a result of application of force and/or relative movement. The second step is necessary for preventing the belt from being ejected uncontrollably from the seat buckle under the tension on the belt when the seatbelt is unlocked for the purpose of disembarking.

In one or more embodiments of the present invention, the coupling of method step 1 is released e.g. by unhooking, uncatching, disengaging, separation of an engagement, etc.

One or more embodiments of the present invention also may be a safety system for use in a vehicle, in particular in an amusement vehicle, comprising a seat, a restraint system with at least one restraint device and a closure device as described above.

According to one or more embodiments of the present invention, a seat may comprise any device suitable for accommodating a passenger. A restraint system may comprise a restraint device and in addition locks, receptacles, restoring and tensioning devices, etc.

In one or more embodiments of the present invention, the restraint device may comprise a belt, a ratchet, a retaining chain or a retaining rope.

BRIEF DESCRIPTION OF THE FIGURES

FIG. 4A is a perspective view of a locking mechanism having a locking device and a blocking device, wherein the locking device is in the first position relative to the blocking device as per FIGS. 3B and 3C;

FIG. 4B is a perspective view of the locking mechanism of FIG. 4A in which the locking device is being inserted in a housing of the blocking device (but not yet in a position to be locked by the housing);

FIG. 4C is a perspective view of the locking mechanism of FIGS. 4A and 4B, wherein the locking device is in a second position relative to the blocking device, namely, in which the locking device is located in the housing of the blocking device; in the second position the coupling between first and second connecting member is locked;

DETAILED DESCRIPTION

The present invention is described below by way of exemplary embodiments.

Figure 1:
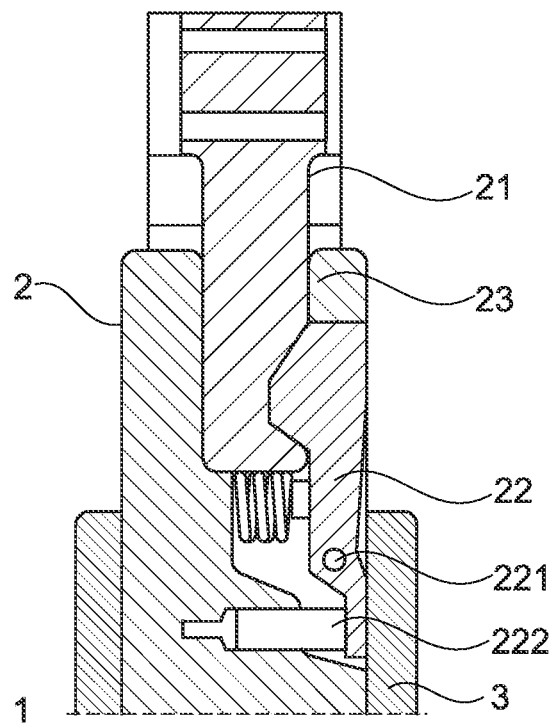
FIG. 1 is a lateral view of a first embodiment of a locking mechanism according to the present invention having a locking device, comprising a first and a second connecting member and a blocking device.
Figure 2:
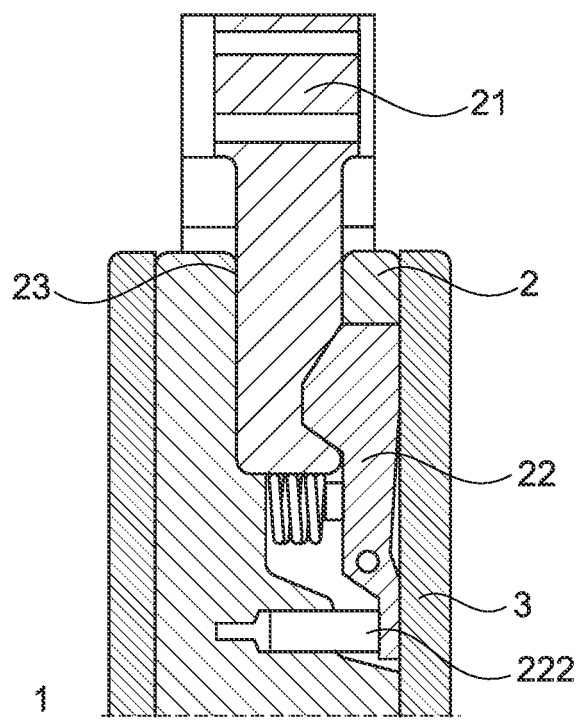
FIG. 2 is a lateral view of the first embodiment of the locking mechanism in a locked state, in which the blocking device locks the second connecting member and the first connecting member.

FIGS. 1 and 2 show lateral cross-sectional views of a first embodiment of the present invention with a locking device 2 provided in the form of a belt buckle in an unlocked first position (FIG. 1) and in a locked second position (FIG. 2). The closure device 1 has a locking device 2, including of a first connecting member 21 and a second connecting member 22. Further, locking device 2 has a receptacle 23 for receiving the first connecting member 21. The closure device 1 also comprises a blocking device 3.

FIG. 1 shows the closure device 1 in first position of the locking device 2 and the blocking device 3, in which the belt hook 21 has been inserted into receptacle 23 and is in engagement with the locking hook 22. As a result of a (counter-)force applied by the locating member 222 which is provided in the form of a spring, a positive lock is formed when the belt hook 21 engages with the locking hook 22. To unbuckle the belt hook 21 a certain tensile force (which is determined by the force of the spring on the locking hook and by the geometry of the positive-lock coupling and is therefore adjustable) can be used to push the locking hook 22 aside such that the belt hook 21 can be pulled out of the receptacle 23. To this end, the area of the catch and/or the area of the contact surfaces of the belt hook 21 and the locking hook 22 are formed with inclined contact surfaces which partly transform the tensile force exerted on the belt hook 21 into a transverse force, which exerts an outwardly directed force on the locking hook 22 and a force directed against the force of the locating member 222.

In the present embodiment, the first connecting member 21 is configured in the form of a belt hook, attached to which is a belt for restraining a passenger (not shown). The second connecting member 22 has the shape of a locking hook, which is configured to complement the belt hook, in order to allow for mutual hooking/engagement. The locking hook 22 is disposed such that it can be rotated about a rotary axis 221. The rotary movement is restricted on one side by the blocking device 3 as soon as the locking device is at least partially accommodated inside the blocking device 3 (as shown in FIG. 2). Further, a locating member 222 in the form of a spring is disposed on the side opposite the locking hook. The locating member 222 exerts a force on the second connecting member 22, as a result of which the second connecting member 22 is moved towards the first connecting member 21 wherein a force is applied to the first connecting member 22.

Thus, for the purpose of releasing the coupling between first and second connecting member, the locking hook 22 can be pushed aside by application of a certain (tensile) force such that the belt hook 21 can be pulled out, as long as the coupled connecting members are in a first position (not shown) relative to the blocking device 3.

In order to prevent the belt hook from being accidentally or inadvertently pulled out of the receptacle 23, e.g. during a ride, the locking hook 22 is locked by moving it in a second position relative to the blocking device 3 in accordance with the representation in FIG. 2. In fact, the locking device 2, after insertion of the belt hook 21 and engagement with the locking hook 22, is pulled downwards into the blocking device 3, which is essentially provided in the form of a sleeve (housing), and thus the locking device 2 is brought in the second, blocked position. The spring force of the positioning member 222 exerted on the locking hook 22 is to be rated strong enough such that, as the locking device 2 is being moved into the blocking member 3, the belt hook 21 does not slip out of the receptacle 23 of the locking device 2 due to e.g. the counterforce acting on the belt. On the other hand, before locking the locking device it should be as easy as possible for the passenger to pull the belt hook 21 out of the receptacle 23 during unbuckling. This will be possible as soon as the locking device 2 is located again in the first position outside the blocking device 3. Besides the spring force of the positioning member 222 the slope of the contact line or contact surface, and/or the coupling between the belt hook 21 and the locking hook 22, determine the minimum pull-out force required to release the belt hook 21 from the locking hook 22.

In the second position, the locking member 3 suppresses movement of the second connecting member 22 in the form of the locking hook 22, at least to the extent that the latter cannot disengage from the belt hook 21. In particular, the possibility of pushing the locking hook 22 aside relative to the belt hook 21 is blocked. As a result, the belt hook 21 too is locked and secured.

It can be seen from FIGS. 1 and 2 that, as a result of the positive locking between belt hook 21 and locking hook 22 and the counterforce of the positioning member 222, the locking device 2 which is provided in the form of a buckle snaps into place when inserted, but that the fixing or locking occurs only in the second step by blocking the locking hook 22 by way of the blocking device 3.

The same is true for unfastening of the belt, where unblocking is carried out first and then the belt hook 21 (with belt) is pulled out of the receptacle 23 in a controlled manner under application of a predetermined minimum tensile force. In this way, the blocking process takes place at a separate time from engagement and disengagement of the belt hook, a fact which makes it possible to make corrections during embarkation (e.g. to unbuckle again and rebuckle in a different sitting position) and, during unblocking, prevents the belt from being ejected uncontrollably from the buckle due to the tension on the belt before the locking step.

FIGS. 3A-3C and 4A-4C show a second embodiment of a closure device 4. In contrast to the first embodiment, a movement is required to create and release a coupling between the first and the second connecting member in the first position (shown in FIGS. 3A, 3B, 4A, and 4B, respectively).

Figure 3A:
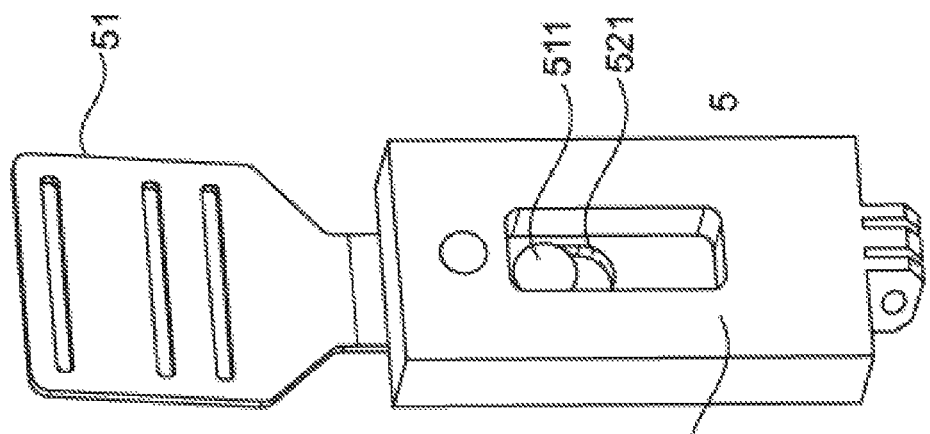
FIG. 3A is a perspective view of a second embodiment of a locking mechanism according to the present invention, wherein the first connecting member is provided in the form of a belt tongue with a fastening member. The first connecting member is in a state detached from the second connecting member; the second connecting member has a receiving and locking member for coupling of the belt tongue.

FIG. 3A shows the components of the locking device 5 having a first connecting member 51 in the form of a belt tongue and a second connecting member 52. The belt tongue 51 has a base 510 which has several openings 512 at one end to receive a portion of a belt (not shown). At its other end the tongue 51 comprises a mushroom-shaped connecting member 511, the upper side of which has a larger diameter than the region closer to the base 510. The connecting member 511 is attached to the other end of the base 510 of the belt tongue 51. The upper side of the connecting member 511 and the base 510 determine a groove. The second connecting member 52 has a corresponding receptacle 521 for the connecting member 511. The receptacle 521 is divided into two parts and has an opening, the diameter of which is equal to or greater than the upper side of the connecting member 511, and an adjoining smaller opening corresponding to the lower part of the connecting member 511. The openings are connected and form an opening similar to a key-hole. Furthermore, the second connecting member 52 has a guide member 522 for guiding the movement of the belt tongue 521 upon locking of the belt tongue 521 at the second connecting member 52.

Figure 3B:
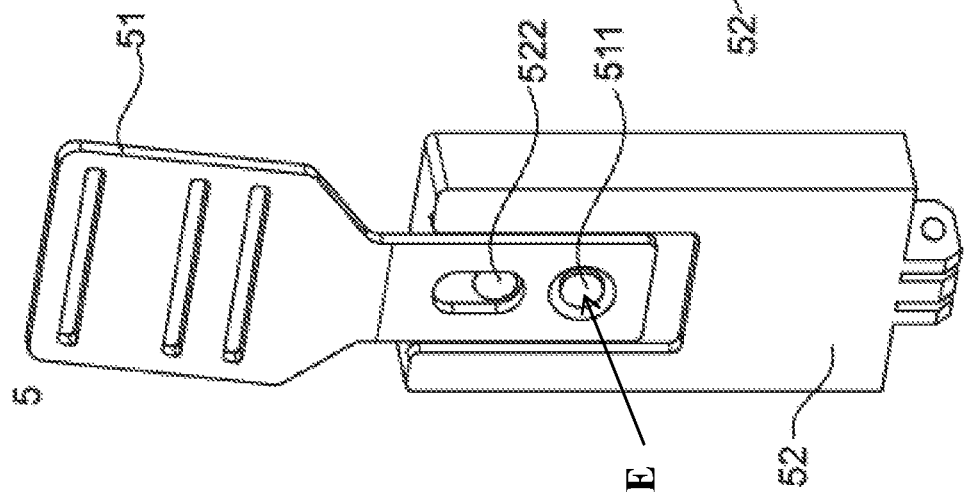
FIG. 3B is a perspective view of the second embodiment comprising a locking mechanism in which the belt tongue is in a first position relative to the second connecting member. The tongue and the receiving and locking member are in engagement.
Figure 3C:
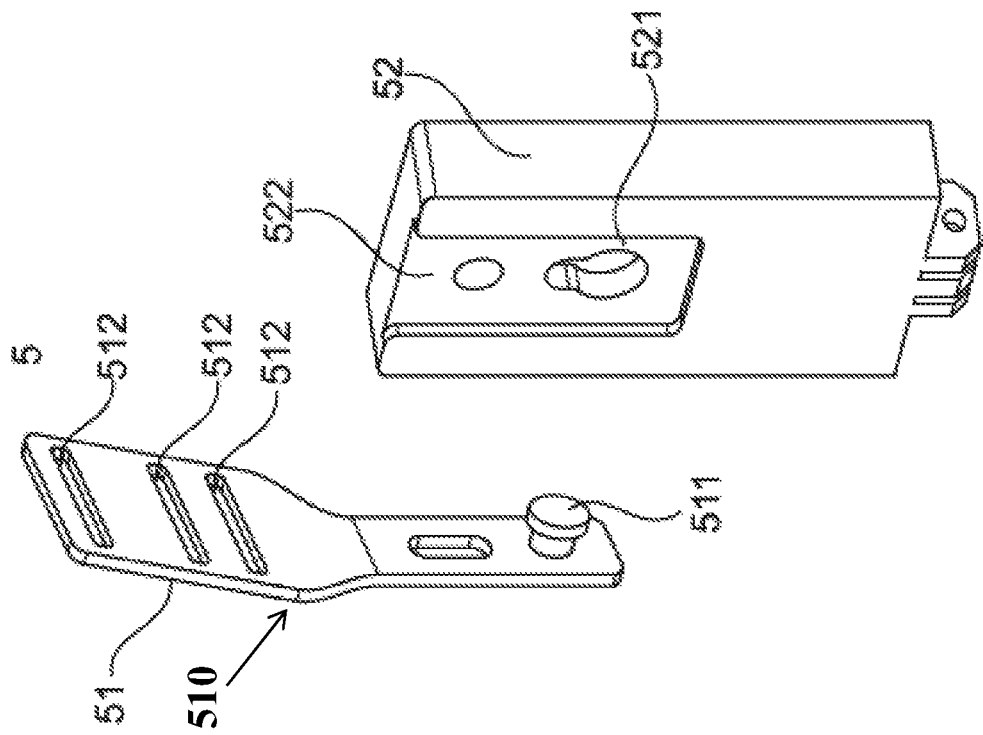
FIG. 3C is a rear view of the perspective representation of FIG. 3B, in which the belt tongue is in engagement with the second connecting member.

During the closure process, first the connecting member 511 of the belt tongue 51 is inserted or hooked into the larger area of the receptacle 521 of the second connecting member 52 along an insertion direction E (see FIGS. 3B and 3C). As a result of a subsequent movement, connecting member 511 is pushed into the smaller opening of the second connecting member 52 and a groove connection is created between the groove formed between connecting member 511 and base 510 and the receptacle 521.

FIG. 3C shows a rear view in accordance with FIG. 3B. It can be seen that the upper part of the connecting member 511 is located above the smaller opening of the receiving member 521 and thus creates a coupling between belt tongue 51 and second connecting member 52. During movement of the connecting member 511 from the larger opening area into the smaller opening area, the groove formed between the upper part of the connecting member 511 and the base 510 of the belt tongue 51 hooks onto the edge of the smaller opening.

After hook-on, the coupling between the belt tongue 51 and the second connecting member 52 can be released by a release movement to be executed by the user through moving the connecting member 511 towards the larger opening of the receiving member 521.

FIGS. 4A-4C show how locking of the coupled connecting elements of FIG. 3 is provided by moving the locking device 5 in a second position relative to a blocking device 3. The blocking device 3 is configured in the form of a housing that encloses the locking device 5 when the locking device 5 has been inserted sufficiently far into the housing (second position).

Proceeding from the first position as per FIG. 3C, the locking device 5 is pulled into the blocking device 3 by way of suitable movement mechanism, e.g. one or more gas strut(s) 61 (see FIGS. 4A and 4B), until it has been introduced sufficiently far into the locking device 5 (see FIG. 4C). The coupling between the belt tongue 51 and the second connecting member 52 is locked along the insertion direction E due to the immovability of the connecting member 511 relative to the receiving member 521 and nor can it be separated by a movement of the two connecting members towards each other.

Figure 5A:
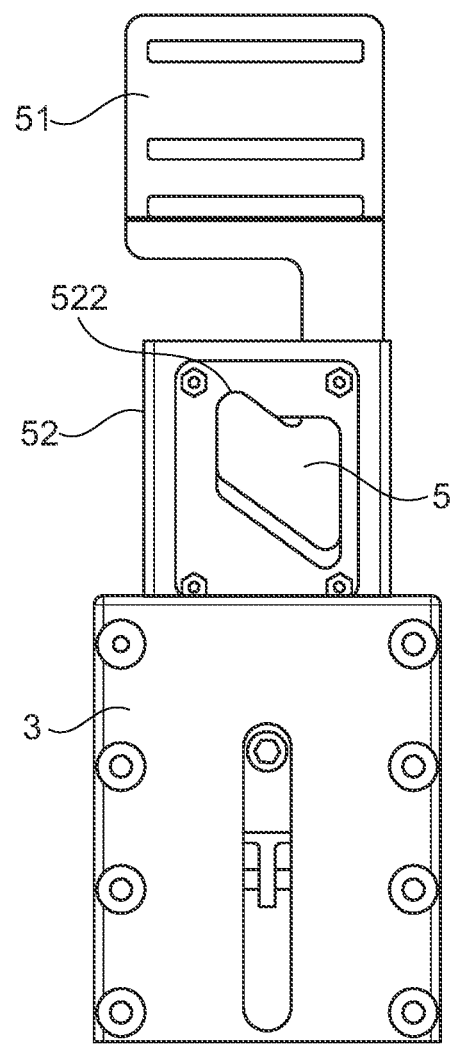
FIG. 5A is a front view of a third embodiment of a closure device according to the present invention, in which a hook-shaped belt tongue is hooked from the side into the second receiving member and thus creates a releasable coupling in the first position of the blocking device relative to the locking device.
Figure 5B:
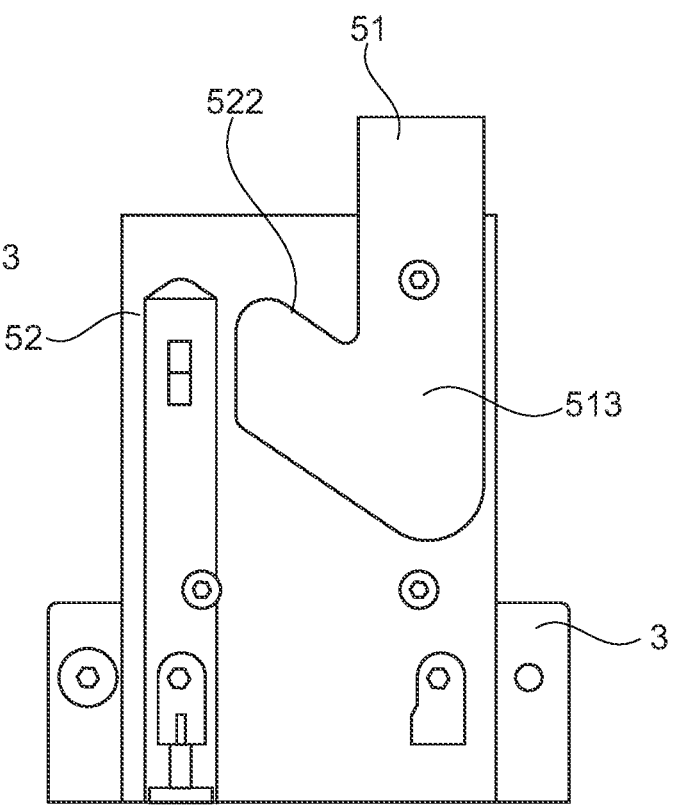
FIG. 5B is a detailed view of the third embodiment of the present invention as per FIG. 5A, showing the coupling between the belt tongue and the second receiving member.

FIGS. 5A and 5B show a third embodiment of the present invention, which is a variant of the second embodiment, but in which the belt tongue 51 comprises a hook which is moved into a receiving member 52 through an opening provided in a side of the receiving member 52. The connecting member 513 of the belt tongue 51 has a hook which is hooked into a corresponding receptacle 522 of the connecting member 52. As long as the locking device 5 is in a first position relative to the blocking device 3 (see FIGS. 5A, 5B) the coupling between the belt tongue 51 and the second connecting member 52 can be released by unhooking. FIG. 5B shows the above arrangement in detail. The second position corresponds to the principle shown in FIGS. 4A and 4B, wherein lateral unhooking of the hook of the belt tongue 51 from that of the receiving member 52 is prevented and/or blocked by the at least partial accommodation of the locking device 5 in the blocking device 3 (not shown).

The present disclosure may include one or more of the following concepts:

Paragraph A. A closure device for closing a restraint system, comprising a locking device having a first connecting member and a second connecting member, and a blocking device, wherein the locking device and the blocking device interact in such a way that, in at least a first position of the locking device relative to the blocking device, the locking device provides a releasable coupling between the first connecting member and the second connecting member when at least a predetermined force is exerted on the first connecting member relative to the second connecting member, wherein in at least a second position of the locking device relative to the blocking device the locking device provides a non-releasable coupling between the first connecting member and the second connecting member.

Paragraph B. A closure device for closing a restraint system, comprising a locking device having a first connecting member and a second connecting member, and a blocking device, wherein the locking device and the blocking device interact in such a way that, in at least a first position of the locking device relative to the blocking device the locking device provides a releasable coupling between the first connecting member and the second connecting member by a movement of the first connecting member relative to the second connecting member, wherein in at least a second position of the locking device relative to the blocking device the locking device provides a non-releasable coupling between the first connecting member and the second connecting member.

Paragraph C. The closure device for closing a restraint system in accordance with Paragraphs A or B, wherein the non-releasable coupling in the second position is provided by a movement of the blocking device relative to the locking device.

Paragraph D. The closure device for closing a restraint system in accordance with Paragraphs A or B, wherein the non-releasable coupling in the second position is provided by electrical and/or magnetic and/or mechanical transfer of the blocking device from the first position to the second position.

Paragraph E. A closure device for closing a restraint system, comprising a locking device having a first connecting member and a second connecting member, and a blocking device, wherein the locking device and the blocking device interact in such a way that, in a first state of the blocking device, the locking device provides a releasable coupling between the first connecting member and the second connecting member when at least a predetermined force is exerted on the first connecting member relative to the second connecting member, wherein in a second state of the blocking device the locking device provides a non-releasable coupling between the first connecting member and the second connecting member.

Paragraph F. The closure device for closing a restraint system in accordance with Paragraphs A or D, wherein the force for releasing the first connecting member from the second connecting member is adjustable.

Paragraph G. The closure device for closing a restraint system in accordance with Paragraphs A, B or D, wherein the locking device comprises a positioning member, which is disposed at the second connecting member and is capable of holding the second connecting member in a predetermined position.

Paragraph H. The closure device for closing a restraint system in accordance with Paragraph G, wherein the positioning member comprises at least one of a spring and an elastic material, and an electrical, magnetic or mechanical device for locating the second connecting member.

Paragraph I. The closure device for closing a restraint system in accordance with Paragraph G, wherein the force for releasing the first connecting member from the second connecting member in the first position is applied and determined, respectively, by the positioning member.

Paragraph J. The closure device for closing a restraint system in accordance with Paragraphs A, B or D, wherein the blocking device has at least one of a sleeve shape and a housing shape, which at least partially encloses the locking device.

Paragraph K. The closure device for closing a restraint system in accordance with Paragraphs A, B or D, wherein the locking device has a sensor which is suitable for monitoring the state of the locking device.

Paragraph L. A method for closing a restraint system, comprising the following steps:
1. Coupling of a first connecting member to a second connecting member of a locking device of the restraint system;
2. Locking and securing of a second receiving member by a blocking device, wherein the time when step 1 is executed is offset from the time when step 2 is executed.

Paragraph M. The method for closing a restraint system in accordance with Paragraph L, wherein the coupling in method step 1 is effected by hooking, catching, latching or engaging.

Paragraph N. The method for closing a restraint system in accordance with Paragraph L, wherein the coupling provided between the first connecting member and the second connecting member in the first method step can be released by applying at least a predetermined minimum force.

Paragraph O. The method for closing a restraint system in accordance with Paragraph L, wherein the coupling created between the first connecting member and the second connecting member in the second method step is unreleasably fixed.

Paragraph P. A method for releasing a restraint system, comprising the following steps:
1. Unlocking of a second connecting member from a blocking device,
2. Releasing of a coupling of a first connecting member to a second connecting member by application of at least a predetermined minimum force and/or by movement of the first connecting member and/or the second connecting member and/or the two connecting members relative to each other, wherein the time when step 1 is executed is offset from the time when step 2 is executed.

Paragraph Q. The method for releasing a restraint system in accordance with Paragraph P, wherein the releasing of the coupling in method step 1 is effected by unhooking, uncatching, unlatching or separation of an engagement.

Paragraph R. A safety system for use in a vehicle, especially an amusement vehicle, comprising:

a seat, a restraint system comprising at least one restraint device, and a closure device for closing a restraint system, comprising a locking device having a first connecting member and a second connecting member, and a blocking device, wherein the locking device and the blocking device interact in such a way that, in at least a first position of the locking device relative to the blocking device, the locking device provides a releasable coupling between the first connecting member and the second connecting member when at least a predetermined force is exerted on the first connecting member relative to the second connecting member, and, in at least a second position of the locking device relative to the blocking device, the locking device provides a non-releasable coupling between the first connecting member and the second connecting member.

Paragraph S. The safety system in accordance with Paragraph R, wherein the restraint device is a belt, a ratchet, a retaining chain or a retaining rope.

Although the present disclosure has shown and described the foregoing operational principles and embodiments, it will be apparent to those skilled in the art that various changes in form and detail may be made without departing from the spirit and scope of the disclosure. All such alternatives, modifications and variances should be considered to be included within the scope of the present disclosure.

What is claimed is:

1. A closure device for closing a restraint system, the closure device comprising:
   a blocking device; and
   a locking device having a first connecting member and a second connecting member;
   wherein the locking device and the blocking device interact in such a way that, in at least a first position of the locking device relative to the blocking device, the first connecting member releasably coupled to the second connecting member, and, in at least a second position of the locking device relative to the blocking device, the blocking device prevents release of the first connecting member from the second connecting member.

2. The closure device for closing a restraint system in accordance with claim 1, wherein a transition from the first position to the second position is enabled by a movement of the blocking device relative to the locking device.

3. The closure device for closing a restraint system in accordance with claim 1, wherein a transition from the first position to the second position is enabled by electrical and/or magnetic and/or mechanical movement of the blocking device.

4. The closure device for closing a restraint system in accordance with claim 1, wherein, in the first position, a force for releasing the first connecting member from the second connecting member is adjustable.

5. The closure device for closing a restraint system in accordance with claim 1, wherein the locking device further includes a positioning member configured to hold the second connecting member in a predetermined position.

6. The closure device for closing a restraint system in accordance with claim 5, wherein the positioning member comprises at least one of a spring and an elastic material, and an electrical, magnetic, or mechanical device configured to locate the second connecting member.

7. The closure device for closing a restraint system in accordance with claim 5, wherein a force for releasing the first connecting member from the second connecting member in the first position is applied and determined by the positioning member.

8. The closure device for closing a restraint system in accordance with claim 1, wherein the blocking device has at least one of a sleeve shape and a housing shape, which at least partially encloses the locking device.

9. The closure device for closing a restraint system in accordance with claim 1, wherein the locking device has a sensor which is suitable for monitoring the position of the locking device.

10. A closure device for closing a restraint system, the closure device comprising:
    a blocking device; and,
    a locking device having a first connecting member and a second connecting member;
    wherein the first connecting member and the second connecting member are configured to be connected together along a movement plane by an insertion movement and to be released by an opposite removal movement; and
    wherein the locking device and the blocking device interact in such a way that, in at least a first position of the locking device relative to the blocking device, the first connecting member is releasably coupled to the second connecting member, and, in at least a second position of the locking device relative to the blocking device, the blocking device prevents release of the first connecting member from the second connecting member.

11. A closure device for closing a restraint system, the closure device comprising:
    a blocking device; and
    a locking device having a first connecting member and a second connecting member;
    wherein the locking device and the blocking device interact in such a way that, in a first state of the blocking device, the first connecting member is releasably coupled to the second connecting member, and, in a second state of the blocking device, the blocking device prevents release of the first connecting member from the second connecting member.

12. A safety system for use in a vehicle, especially an amusement vehicle, comprising:
    a seat;
    a restraint system including at least one restraint device configured to restrain a user on the seat; and
    a closure device for closing the restraint system, including a blocking device and a locking device having a first connecting member and a second connecting member;
    wherein the locking device and the blocking device interact in such a way that, in at least a first position of the locking device relative to the blocking device, the first connecting member is releasable coupled to the second connecting member, and, in at least a second position of the locking device relative to the blocking device, the blocking device prevents release of the first connecting member from the second connecting member.

13. The safety system in accordance with claim 12, wherein the restraint device is one of a belt, a ratchet, a retaining chain or a retaining rope.

14. The safety system in accordance with claim 12, wherein the first connecting member and the second connecting member are configured to be connected together along a movement plane by an insertion movement and to be released by an opposite removal movement.

15. The closure device in accordance with claim 1, wherein, in the second position, the locking device is disposed at least partially inside the blocking device.

16. The safety system in accordance with claim 12, wherein, in the second position, the locking device is disposed at least partially inside the blocking device.

* * * * *